United States Patent
Riocreux et al.

(10) Patent No.: US 8,732,400 B2
(45) Date of Patent: May 20, 2014

(54) DATA STORE MAINTENANCE REQUESTS IN INTERCONNECTS

(75) Inventors: Peter Andrew Riocreux, Cheadle (GB); Bruce James Mathewson, Papworth Everand (GB); Christopher William Laycock, Sheffield (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 671 days.

(21) Appl. No.: 12/923,725

(22) Filed: Oct. 5, 2010

(65) Prior Publication Data

US 2011/0119448 A1     May 19, 2011

(30) Foreign Application Priority Data

Oct. 13, 2009   (GB) .................................. 0917946.6
Apr. 30, 2010   (GB) .................................. 1007342.7
Apr. 30, 2010   (GB) .................................. 1007363.3
Oct. 1, 2010   (GB) .................................. 1016482.0

(51) Int. Cl.
    *G06F 12/00*      (2006.01)

(52) U.S. Cl.
    USPC ........... 711/131; 711/100; 711/113; 711/141; 711/149; 711/154

(58) Field of Classification Search
    CPC ............ G06F 12/0815; G06F 13/1621; G06F 12/0811; G06F 12/0835
    USPC .................. 711/131, 100, 113, 141, 149, 154
    See application file for complete search history.

(56) References Cited

U.S. PATENT DOCUMENTS 5,675,579 A    10/1997   Watson et al.
6,038,646 A    3/2000   Sproull (Continued)

FOREIGN PATENT DOCUMENTS

EP      1 594 061     11/2005
EP      2 015 167     1/2009
WO    WO 2006/102667     9/2006

OTHER PUBLICATIONS

Search Report for UK 1007342.7 dated Aug. 20, 2010.

(Continued)

*Primary Examiner* — Midys Rojas
(74) *Attorney, Agent, or Firm* — Nixon & Vanderhye P.C.

(57) ABSTRACT

Interconnect circuitry for a data processing apparatus is disclosed. The interconnect circuitry is configured to provide data routes via which at least one initiator device may access at least one recipient device. The interconnect circuitry comprises: at least one input for receiving transaction requests from the initiator device(s); at least one output for outputting transaction requests to the recipient device(s); a plurality of paths for transmitting said transaction requests between the at least one input and the at least one output; wherein at least one of said transaction requests comprises a data store maintenance request requesting a data store maintenance operation to be performed on data stores within the data processing apparatus; and control circuitry for routing the received transaction requests from the at least one input to the at least one output; wherein the control circuitry is configured to respond to receipt of the data store maintenance operation by transmitting the data store maintenance operation along at least one of the plurality of paths followed by a barrier transaction request, the control circuitry being configured to maintain an ordering of at least some transaction requests with respect to the barrier transaction request within a stream of transaction requests passing along the at least one of said plurality of paths, such that at least some transaction requests subsequent to the data store maintenance request in the stream of transaction requests are held behind the data store maintenance request by the barrier transaction request.

33 Claims, 8 Drawing Sheets

(56) References Cited

U.S. PATENT DOCUMENTS

| | | |
|---|---|---|
| 6,748,518 B1 | 6/2004 | Guthrie et al. |
| 6,967,926 B1 | 11/2005 | Williams et al. |
| 2006/0218335 A1 | 9/2006 | Hofmann et al. |
| 2007/0250668 A1 | 10/2007 | Arimilli et al. |

OTHER PUBLICATIONS

Search Report for UK 1007363.3 dated Aug. 23, 2010.

DATA STORE MAINTENANCE REQUESTS IN INTERCONNECTS

BACKGROUND OF THE INVENTION

1. Field of the Invention

This invention relates to the field of data processing apparatus having data stores including both caches and memory. More particularly the invention relates to interconnect circuitry for these data processing apparatus, the interconnect circuitry providing data routes via which one or more initiator devices such as a master may access one or more recipient devices such as a slave.

2. Description of the Prior Art

Interconnects are used to provide connections between different components in data processing systems. They provide data routes via which one or more initiator devices may access one or more recipient device. An initiator device is simply a device that generates a transaction request, and therefore may be a master such as a processor or it may be another interconnect. A recipient device is simply a device that receives the transactions and it may be a slave such as a peripheral or it may also be another interconnect.

As systems become more complex with multiple processors communicating with each other and with multiple devices, and with different storage facilities including both caches providing fast data access and memory, authors writing software for multiprocessor systems need detailed knowledge of the topology and latency of an architecture, in order to write software which ensures consistent behaviour of interacting processes across time. Even with this detailed knowledge this consistency is only achieved with some non-trivial effort and cost to performance.

It would be desirable to provide mechanisms that allowed a programmer to ensure consistent behaviour of interacting processes across time in a generic manner for an arbitrary architecture.

There are particular problems associated with data store maintenance operations in complex systems with arbitrary architectures as it is important to know when these operations are complete and yet if the system is not sure of the number or arrangement of the data stores, then this may be difficult to track.

For example in a system having multiple caches at least some of which can be accessed by more than one master, it will be difficult to determine for any cache maintenance operation that maintains the caches when this maintenance is complete without a detailed knowledge of the architecture and in particular, of the number and arrangement of the caches. Thus, data store maintenance operations provide a particular problem when designing architecturally agnostic systems.

This application claims priority to GB Application No. 0917946.5 filed 13 Oct. 2009, GB Application No. 1007363.3 filed 30 Apr. 2010, GB Application No. 1007342.7 filed 30 Apr. 2010 and GB Application No. 1016482.0 filed 1 Oct. 2010, the entire contents of each of which are incorporated herein by reference.

SUMMARY OF THE INVENTION

A first aspect of the invention provides interconnect circuitry for a data processing apparatus, said interconnect circuitry being configured to provide data routes via which at least one initiator device may access at least one recipient device, said interconnect circuitry comprising: at least one input for receiving transaction requests from said at least one initiator device; at least one output for outputting transaction requests to said at least one recipient device; a plurality of paths for transmitting said transaction requests between said at least one input and said at least one output; wherein at least one of said transaction requests comprises a data store maintenance request requesting a data store maintenance operation to be performed on data stores within said data processing apparatus; and control circuitry for routing said received transaction requests from said at least one input to said at least one output; wherein said control circuitry is configured to respond to receipt of said data store maintenance request by transmitting said data store maintenance request along at least one of said plurality of paths followed by a barrier transaction request, said control circuitry being configured to maintain an ordering of at least some transaction requests with respect to said barrier transaction request within a stream of transaction requests passing along said at least one of said plurality of paths, such that at least some transaction requests prior to said data store maintenance request in said stream of transaction requests are held in front of said data store maintenance request by said barrier transaction request and at least some transaction requests subsequent to said data store maintenance request in said stream of transaction requests are held behind said data store maintenance request by said barrier transaction request.

The present invention recognises the problems that data store maintenance operations present to a data processing system and addresses these problems with the use of barriers. If an interconnect is set up to respond to barrier transaction requests by not allowing reordering of at least some instructions across the barrier, then a barrier can be used behind a data store maintenance operation to prevent transactions subsequent to the data store maintenance request from being performed before it. Furthermore, the interconnect simply needs to be set up to operate in response to the barrier, and no knowledge of the caches that are present and their locations needs to be known to ensure correct and consistent performance of the data store maintenance operations. Additionally, if the interconnect is set up to act in response to barriers for other reasons, then this functionality can be used to deal effectively with data store maintenance operations without the need for any significant additional overhead.

The ordering can be maintained by not allowing at least some transaction requests to overtake or be overtaken by the barrier transaction request, thus, the barrier sits in the stream of transaction requests and maintains ordering around it.

In some embodiments said control circuitry is configured to respond to said barrier transaction request to maintain an ordering of said at least some transaction requests subsequent to said barrier transaction request by delaying transmission along said one of said plurality of paths of said at least some transaction requests until receipt of a response signal clearing said barrier transaction.

In a system where the at least some transaction requests that are to be kept behind the barrier have been delayed perhaps by blocking circuitry then transaction requests that are behind the barrier can be allowed to overtake it as these are not the transaction requests that are to have their order maintained by the barrier as the transaction requests that should stay behind the barrier have already been delayed upstream. However, all transaction requests in front of the barrier must remain in front of it.

In some embodiments said data store maintenance request comprises a cache maintenance request, said data processing apparatus comprising at least one memory and one or more caches for storing local copies of data items stored in said at least one memory, said interconnect circuitry being configured to transmit said cache maintenance request and said barrier transaction request to at least one of said one or more caches.

Cache maintenance requests need to be performed in a certain order in order to maintain data coherency and thus, in a system in which different devices that may operate at different speeds communicate with each other via an interconnect, barrier transactions may be useful to help maintain the ordering.

In some embodiments, said interconnect circuitry is configured to receive said response signal from said at least one cache.

The cache may be configured such that it generates a response signal when it receives the barrier transaction request following the cache maintenance transaction request. The cache may simply generate and transmit the response following receipt of the barrier transaction request, in which case the response provides an indication to the initiator device that the cache maintenance request has arrived at the cache, or the cache may be configured to only send a response to the barrier when the cache maintenance operations requested have proceeded to such a point that further transactions can safely be handled by the cache. This point will depend on the design of the cache and may be when the cache maintenance operations that are performed within the cache itself (e.g. invalidating lines) have completed, even if other operations that have been triggered by these cache maintenance operations such as for example writing dirty data to the memory are still pending. It should be noted that if maintenance transaction requests are sent further then the barrier transaction request is transmitted further behind them.

In some embodiments, said interconnect circuitry comprises at least one of said one or more caches, said at least one cache being configured to hold said barrier transaction request at an input to said cache and not to receive any further transaction requests, and in response to control circuitry associated with said cache determining that said cache maintenance request has been processed to a point at which it is safe to receive further transaction requests said at least one cache is configured to receive said further transaction requests.

If the barrier transaction request has not blocked transaction requests upstream, then in some embodiments it may be held on an input to the cache so that no further transaction requests can be received by the cache until the control circuitry determines that it is safe from a data coherency point of view for the cache to receive further transaction requests.

In some embodiments said cache maintenance request triggers transaction requests to be transmitted to further data stores, said point comprising a point at which all transactions stemming from said cache maintenance operations have been transmitted further, said control circuitry being configured to transmit said barrier transaction request further behind said transactions stemming from said cache maintenance operation.

In the case that the cache maintenance request does not trigger further transaction requests to further data stores then the control circuitry is configured to eliminate said barrier transaction request in response to determining that said cache maintenance request has been processed to said point at which it is safe to receive further transaction requests.

If the cache maintenance request triggers further transaction requests then the barrier transaction request is sent after these requests. If no further transaction requests are generated by the cache maintenance request, in other words, if all the cache maintenance operations are performed within the cache, and the cache is at the end of a path such that there are no further caches beyond it then once the barrier is no longer required to block the input to the cache it may be eliminated.

In some embodiments said cache maintenance request is directed to one or more addresses, said barrier transaction request comprising a corresponding one or more addresses, said control circuitry being configured to route said barrier transaction request and said cache maintenance request along at least some of said plurality of paths.

Cache maintenance operations may be performed for the whole of a cache, for example the whole cache may be flushed, or cache maintenance operations may be performed for a single address or range of addresses. In the latter case, it is advantageous if the barrier transaction also contains the address. The control circuitry is configured to route the barrier transaction request and the cache maintenance request along at least some of the paths. It may be that they are routed along all of the paths or it may be that the control circuitry recognises that such a cache maintenance request will never need to service any component along a particular path and then it will not send the barrier or the cache maintenance request along that path. The ability to send the barrier and cache maintenance request down a subset of paths where appropriate reduces the latency that barriers and cache maintenance requests cause to the system.

In some embodiments, said at least some transaction requests subsequent to said cache maintenance request and held behind it by said barrier transaction request comprise transaction requests to said one or more addresses.

One particular advantage of having an address within the barrier transaction request is that this can indicate to the control circuitry the transactions that need to be blocked. Thus, transactions to other addresses that will not be affected by the cache maintenance operations and will not themselves affect the cache maintenance operations can proceed. This is very advantageous as cache maintenance operations can take a relatively long time and thus, if all transactions are stalled waiting for them to complete the latency of the system can be greatly increased. The ability to signal addresses within a barrier transaction request enables this potential latency problem to be significantly improved.

In some embodiments, said at least some of said plurality of paths are paths to any cache that could cache data for said one or more addresses.

The paths that the cache maintenance requests and the barrier transaction requests are sent along could be paths to any cache that could cache data for that address. In such a case, the maintenance operations will be performed for all caches that could cache that address.

In other embodiments, said at least some of said plurality of paths are paths to any cache that said initiator initiating said cache maintenance request can cache data for said one or more addresses in.

Alternatively, the control circuitry may just send the maintenance request and following barrier request to any cache that the initiator of the cache maintenance request can cache data for that address in. It may be that it is only appropriate to maintain a cache that the initiator itself can access and in such a case, the cache maintenance request and barrier transaction request are simply transmitted along those paths.

In some embodiments, at least some of said plurality of paths are divergent paths diverging from a node, said control circuitry being configured to duplicate and transmit said cache maintenance request and said following barrier transaction request along at least some of said divergent paths that said transaction requests are routed along.

Where paths diverge, the cache maintenance request may need to be duplicated to travel on any paths that may contain a cache. Any paths that the cache maintenance request is duplicated to follow the barrier transaction request should also be duplicated to follow and should be sent along behind the duplicated cache maintenance request. In this way, correct behaviour of the data processing apparatus can be ensured.

In some embodiments, said control circuitry is configured to delay transmission of said at least some transaction requests subsequent to said barrier transaction request until after receipt of response signals responding to all of said duplicated barrier transaction requests.

In the case that the barrier transaction requests are blocking then the subsequent transactions requests are blocked until responses to all of the duplicated barrier transaction requests have been received. In this way, one could ensure that no subsequent transactions are sent down any of the paths where they might take the cache maintenance operation down another path and this causing a processing error.

In some embodiments, said control circuitry comprises a response signal generator located at a point of serialisation within said interconnect, beyond which point transaction requests cannot be reordered, said response signal generator being configured to generate said response signal to said barrier transaction request and not to transmit sad barrier transaction request further.

At a point of serialisation within an interconnect one can be sure that subsequent transactions that are transmitted further will maintain the ordering that they are transmitted in. Thus, at such a point a response signal can be sent to the barrier transaction and there is no need to transmit the barrier transaction further as there is no problem of transactions overtaking each other. In this way, barrier transactions can be dealt with efficiently and can be removed from the system when they are no longer needed.

In some embodiments, said control circuitry comprises a response signal generator and blocking circuitry, said response signal generator being responsive to receipt of said barrier transaction request to issue said response signal along an entry path that said barrier transaction request was received from, and said blocking circuitry being responsive to receipt of said barrier transaction request to block all exit paths that said barrier transaction request is transmitted along, to said at least some transaction requests subsequent to said barrier transaction request until receipt of said response signal.

The blocking circuitry may retain the ordering by blocking the path that the barrier has been sent down until receipt of a response signal indicating that the path is clear. If there are several paths then the barrier may be duplicated to go down each or at least a subset and responses may be required from all or all but one to allow the blocking to be stopped.

In some embodiments said response signal generator is located immediately upstream of said blocking circuitry.

The response signal generator and blocking circuitry can be arranged adjacent to each other so that when the barrier reaches these units the paths are cleared so that transactions stalled upstream can be sent further and the exit paths are blocked.

In some embodiments, said plurality of paths comprise at least one bisection path that comprises an only communication path between two nodes within said interconnect circuitry, said two nodes comprising an entry node and an exit node to said bisection path; said response signal generator being located at said entry node and being responsive to receipt of said barrier transaction request to transmit said response signal along said entry path; and said blocking circuitry being located at said exit node and being responsive to receipt of said barrier transaction request to block all exit paths that said barrier transaction request is transmitted along to said at least some transaction requests subsequent to said barrier transaction requests.

Within the interconnect there are paths connecting the various initiator devices and recipient devices. Some of these paths form routes that can be considered to be bisection paths in that they are the only link between two nodes within the interconnect circuitry, such that cutting the path will separate the interconnect in two along this path. A node is any point in the circuitry. In such a case, it can be advantageous to un-block paths that have been blocked by the barrier transaction request when it reaches the entry node to a bisection path, by sending a response signal to clear the paths behind. If the response signal generator is at the start of a bisection path then the blocking circuitry may be located at the end of this path as if the transactions enter a bisection path in the correct order, they must exit it in the same order.

Transaction requests travelling along a bisection path can only travel along one route and thus, must maintain the order that they are sent down the path in relative to the barrier. Thus, if the system has been set up so that they arrive at the entry node in the correct order relative to the barrier, once the barrier transaction request is sent down the bisection path the previous paths can be un-blocked allowing the subsequent transaction requests that had been stalled to be transmitted. Thus, rather than waiting for all the previous instructions to have completed before they are transmitted, they can be transmitted along a portion of the interconnect in response to determining that the barrier transaction request has reached the entry node of a bisection path. In this way, the latency associated with the blocking nature of these barrier transaction requests can be reduced and the performance of the interconnect circuitry significantly improved.

In some embodiments, said interconnect circuitry comprises at least one domain, said at least one domain comprising at least one of said at least one inputs for receiving transaction requests from said at least one initiator device, a domain boundary being arranged such that any merging of transaction requests received from said at least one input occurs within said at least one domain; and said barrier transaction request comprises an indicator indicating whether it applies to said at least one domain; and said control circuitry is responsive to detecting said barrier transaction request comprising said indicator indicating it applies to said at least one domain, being outside of said at least one domain to provide an indication indicating that said barrier transaction is outside of said domain.

It has been recognised that if an interconnect is arranged into domains, wherein domains are selected as being areas of the interconnect within which any merging of transaction requests received from inputs that are within the domain occurs, then barrier transaction requests may be treated differently depending upon whether they are within the domain or outside of it. Thus, it has been found to be advantageous to consider the interconnect as being arranged in domains and for at least some barrier transactions to be marked as applying to a particular domain, then when it is determined that such a barrier transaction request is outside of the domain it applies to, this can be indicated as at this point its barrier behaviour will change. It should be noted that the indicator indicating that the barrier transaction request applies to the domain may in some embodiments be an explicit indicator associated with the request, while in others it may be implicit, the control circuitry being able to determine from the location and type of barrier transaction request that it applies to that domain.

In some embodiments said indication comprises an indicator attached to said barrier transaction request indicating that it is now outside of said domain to which it applies.

This indicator can be used to provide the barrier with different behaviour depending on its location. For example, the barrier may have the property that it only blocks inside it's the domain indicated by the indicator and thus, it may be that it is no longer blocking once outside of this domain even perhaps in a cross-coupled region.

In some embodiments said control circuitry comprises a response signal generator, said response signal generator being configured not to respond to a predetermined type of barrier transaction request if it is within a domain that said indicator indicates said barrier applies to and to respond to said predetermined type of barrier transaction request if it is outside of said domain.

The properties of domains and the variation of the properties of a barrier transaction request depending on whether they are within a particular domain or nor can be used by embodiments of the present of invention to provide an indication to the initiator device of where the cache maintenance request currently is. Some barrier transaction requests cannot be early responded to when they are within their domain, and thus, if a response is received from such a barrier transaction one can be sure that it has exited the domain to which applies. As the data store maintenance transaction request must stay in front of it then this must also have exited the domain. The use of the barrier transaction enables the location of the data store maintenance transaction request to be separated from its operation and to be monitored.

This can be particularly useful when dealing with cache maintenance operations in an architecturally agnostic system that does not know how many caches there are. In such a case a response received from a cache indicating that the requested maintenance has been performed within that cache does not tell the initiator device whether or not there are other caches in the system that still have maintenance operations pending. Thus, following such cache maintenance operation requests with a barrier having a domain indicator which will generate a response on exiting the domain, enables the initiator device to know when all cache maintenance operations within the specified domain have completed. Domain properties are such that if the domain is appropriately selected then this may be sufficient information to allow the initiator device to know that it is safe to transmit further transaction requests.

In some embodiments, said interconnect circuitry comprises a plurality of domains, each of said plurality of domains comprising at least one of said at least one inputs for receiving transaction requests from said at least one initiator device, domain boundaries being arranged such that any merging of transaction requests received from said at least one inputs within one of said domains occur within said one of said domains.

Although, in some embodiments the interconnect circuitry may have a single domain, in other embodiments it has a plurality of domains and provided they are all arranged so that any merging of transaction requests received from inputs within a domain occur within that domains, then they will all have the properties that the barrier transactions behaviour will change on exiting from the domain and this property can be exploited to reduce the latency caused by barriers within the interconnect.

In some embodiments, at least one of said plurality of domains is a subset of a larger domain and there is a hierarchy of domains for each input, such that if an input is a member of a domain of a lower hierarchy it is also a member of a domain of a higher hierarchy, and a transaction exits said domain of said lower hierarchy at a same time as, or before it exits said domain of said higher hierarchy.

In some embodiments, the domains are arranged in hierarchy and this can be used to provide further control of the barrier transaction as will be seen later. Domains of a higher hierarchy are larger than, or the same size as those of the lower hierarchy and enclose them, thus transactions exit the lower hierarchy domains at the same time as or before they exit those of the higher hierarchy.

In some embodiments said domains comprise a non-shareable domain containing only one of said inputs and a system domain comprising all of said inputs, and at least one further type of shareable domain, for each input there is a domain hierarchy such that an input within a non-shareable domain is also within said at least one type of shareable domain for said input, an input within said at least one type of shareable domain is also within said system domain for said input.

It may be useful to have non-sharable domains which are only the input and thus, all barriers marked as non-sharable are outside of their domains when they are within the interconnect, thus an indicator that the barrier applies to a non-shareable domain can be used as an indicator that the barrier is outside of its domain. There are other sharable domains and a system domain which comprises all the inputs and is also itself a sharable domain.

In some embodiments said data processing apparatus comprises a plurality of caches of a plurality of hierarchical levels, said barrier transaction request comprising an indicator indicating at least one of said plurality of hierarchical levels, a cache of said at least one of said plurality of hierarchical levels being configured to generate a response signal in response to receiving said barrier transaction request.

A further way in which the progress of the cache maintenance operations can be determined from responses to the barrier transaction requests is if the barrier transaction request is marked such that only caches of a certain hierarchical level will send a response to the request. In this way, if for example the barrier was marked as only applying to level 2 caches, then the barriers would pass through the level one cache behind the cache maintenance transaction request and no response to the barrier would be sent, a response would only be sent once the level 2 cache was reached.

A second aspect of the present invention provides a recipient device for receiving transaction requests from an initiator device via an interconnect, said recipient device comprising: an input for receiving said transaction requests from said interconnect; a cache; a response signal generator for generating a response signal to a predetermined type of barrier transaction request; said recipient device being configured to respond to receipt of a cache maintenance request at said input followed by one of said predetermined type of barrier transaction request to generate said response to said barrier transaction request, said recipient device being configured to issue said response signal when said recipient device has determined that said cache has performed sufficient cache maintenance operations for said cache to receive and process further transaction requests without compromising data coherency.

A recipient device that is configured only to transmit a response to a certain type of barrier transaction request that follows a cache maintenance request when it has determined that it is safe for the recipient device to receive further transaction requests rather than when these cache maintenance transaction requests are complete, enables the latency of the system to be reduced.

In some embodiments said recipient device is responsive to receipt of a further type of barrier transaction request following a cache maintenance request to hold said barrier transaction request at an input to said recipient device and not to receive further transaction requests until said recipient device has determined that said cache has performed sufficient cache maintenance operations for said cache to receive and process further transaction requests without compromising data coherency.

In some cases the barrier transaction request sits between transaction requests at least some of which must not be reordered with respect to the barrier transaction request. In such a case the recipient device may be configured to retain the barrier transaction request at an input until it can transmit it further or eliminate it. In this way the barrier blocks the entrance to the other transaction requests and these can only proceed once the barrier has been removed.

A third aspect of the present invention provides an initiator device for generating and issuing transactions requests including data store maintenance transaction requests to a recipient device via an interconnect, comprising: a barrier transaction request generator configured to generate a barrier transaction request, said barrier transaction request indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; wherein said initiator device is configured to issue said data store maintenance transaction request followed by said barrier transaction request.

When an initiator device issues a data store maintenance request it is important that other transaction requests that either require access to the data store before the maintenance operations or require access after these operations do not get reordered with respect to this maintenance request. In order to ensure this in an architecturally agnostic way, an initiator device may have a barrier generator that generates a barrier, the initiator device issuing the barrier to follow the data store maintenance operations. The barrier indicates to the interconnect that at least some transactions after it must remain behind it, while at least some in front of it must remain in front.

In some embodiments said barrier generator is configured to provide said generated barrier transaction requests with a blocking or a non-blocking indicator in dependence upon said data store maintenance transaction request.

The barriers that may be generated by the barrier generator may advantageously be blocking or non-blocking, a blocking barrier indicating that the at least some transaction requests that must stay behind it have been blocked upstream so that all transaction may overtake it, while a non-blocking barrier must not be overtaken by the transaction requests that it applies to.

In some embodiments said initiator device is configured in response to said barrier transaction request generator generating said barrier transaction request with said blocking indicator not to issue said at least some transaction requests that occur after said barrier transaction request to said interconnect until said initiator device has received a response to said blocking barrier transaction request; and in response to said barrier transaction request generator generating said barrier transaction request with said non-blocking indicator to issue said at least some transaction requests that occur after said barrier transaction request to said interconnect.

In some embodiments said barrier generator is configured to provide said generated barrier transaction requests with a domain indicator indicative of a domain within said interconnect to which said barrier transaction request applies.

As noted above the control of barrier transaction requests according to domain can provide a useful way of providing information on where the barrier has reached within the interconnect.

A fourth aspect of the present invention provides a method for routing data from at least one initiator device to at least one recipient device via interconnect circuitry, said method comprising: receiving transaction requests from said at least one initiator device at least one input, at least one of said transaction requests comprising a data store maintenance request requesting a data store maintenance operation to be performed on caches within said data processing apparatus; and transmitting said transaction requests along at least one of a plurality of paths towards at least one output; in response to receipt of said data store maintenance request: transmitting said data store maintenance request along at least one of said plurality of paths followed by a barrier transaction request; maintaining an ordering of at least some transaction requests with respect to said barrier transaction request within a stream of transaction requests passing along said at least one of said plurality of paths by holding said at least some transaction requests subsequent to said data store maintenance request behind said barrier request.

A fifth aspect of the present invention provides a data processing apparatus comprising a plurality of initiators including at least one initiator according to a third aspect of the present invention, at least one recipient device and interconnect circuitry according to a first aspect of the present invention for providing a data route between said initiators and said recipient device.

A sixth aspect of the present invention provides a method of generating and issuing data store maintenance transaction requests to a recipient device via an interconnect, comprising: generating one of said data store maintenance transaction requests and then generating a barrier transaction request, said barrier transaction request indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; and issuing said data store maintenance transaction request followed by said barrier transaction request.

BRIEF DESCRIPTION OF THE DRAWINGS

The present invention will be described further, by way of example only, with reference to embodiments thereof as illustrated in the accompanying drawings, in which:

FIGS. 7a, 7b and 8 schematically show how an interconnect can be divided into different domains, some barriers being treated differently depending on the domain they are in.

DESCRIPTION OF THE PREFERRED EMBODIMENTS

Figure 1:
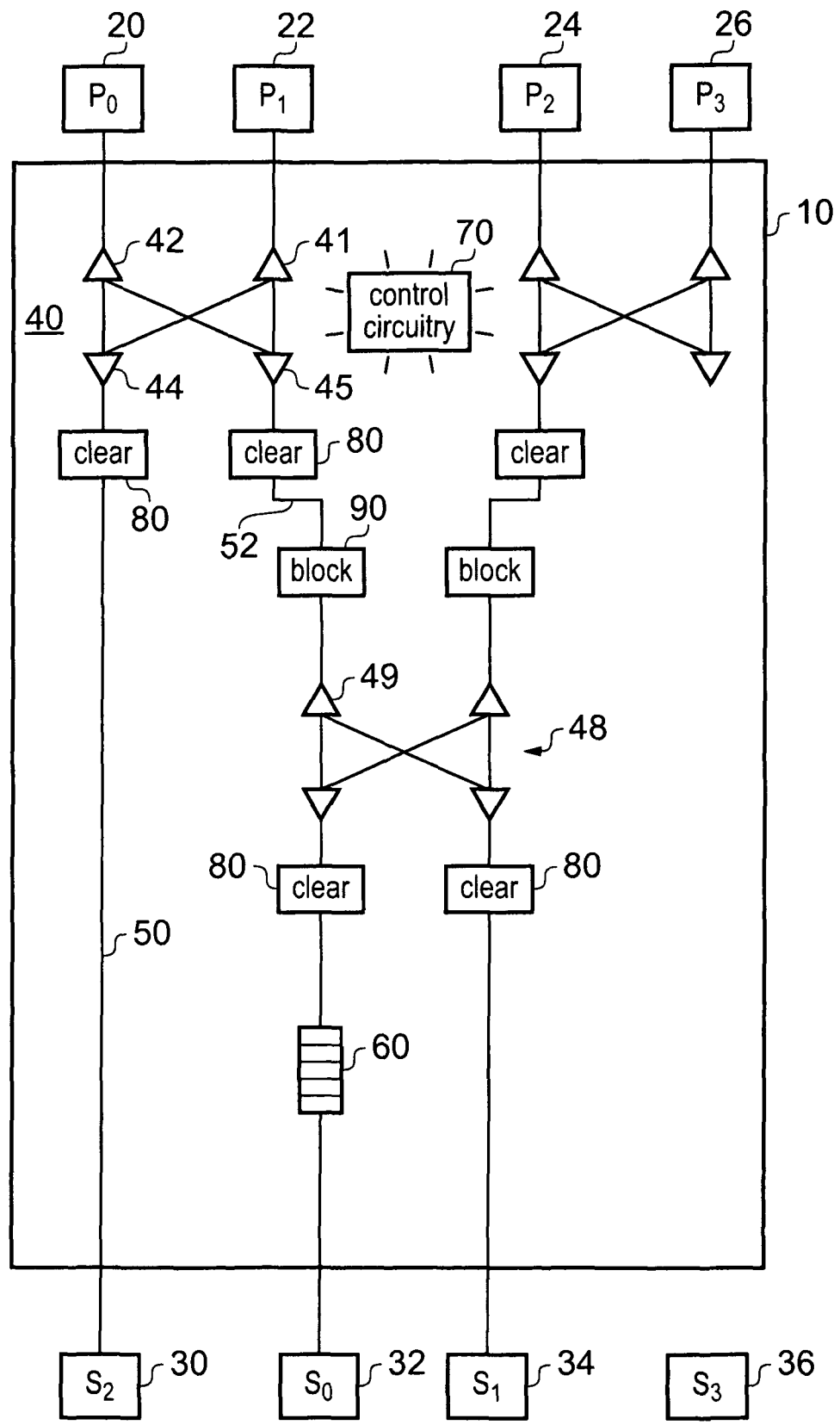
FIG. 1 shows an interconnect suitable for dealing with barriers.

FIG. 1 shows an interconnect 10 that is configured to control the transmission of transaction requests using barriers and it shows how barriers are handled in such an interconnect. Interconnect 10 connects a plurality of masters 20, 22, 24 and 26 to a plurality of slaves 30, 32, 34 and 36 via a plurality of paths. These paths may have cross-coupled portions such as is shown for example at 40 where two paths each split into two at respective split points 41 and 42 and merge at merge points 44 and 45. There may also be bisection paths such as is shown for example at 50. These are paths that are the only connection between two nodes in the interconnect, such that cutting the path will in effect divide the interconnect in two.

When transactions pass along these different paths the nature of the paths, that is to say whether they are cross-coupled or bisection will affect the ordering of the transactions. A cross-coupled path for example will start with a split point that will divide the transaction stream into multiple transaction streams, and a transaction that was behind another transaction in the transaction stream before the split point may arrive at its destination before the transaction that it was previously behind arrives at its own destination. Transactions travelling along a bisection path must keep their order unless there is some functional unit that allows reordering such as a re-order buffer as is shown for example at 60. Re-order buffers are used for re-ordering transactions to allow transactions of a higher priority to be delivered to the slave before transactions of a lower priority.

There are also paths that are termed reconvergent wherein paths that are previously split come back together and this can also cause re-ordering within the transaction stream. Interconnect 10 does not have any reconvergent paths.

The fact that transactions can arrive at their destinations in a different order to the order that they were sent in can lead to problems where a subsequent transaction is dependent on a previous transaction and thus, needs it to complete first. For example, if there is a store instruction ahead of a load instruction to a same address in a transaction stream, then it is important that the store is performed before the load, or the load will read an incorrect value. In order to allow a programmer to ensure that the required transactions arrive in the required order, interconnect 10 is configured to respond to barrier transactions within the transaction stream to maintain ordering of transactions within the interconnect with respect to the barrier. Thus, a barrier transaction can be inserted between transactions which should not overtake each other and this will ensure that this does not occur.

The interconnect may respond to these barrier transactions by delaying the transactions that occur in the transaction stream subsequent to the barrier transaction from progressing through the interconnect until a response signal to the barrier transaction has been received. The response signal indicates that it is safe to send a subsequent instruction. It should be noted that a response signal that clears a path might be a signal indicating that the earlier transactions have all completed, or it may simply be a signal indicating that the barrier transaction has passed along a path, if for example the path is a bisection path, or that the barrier has reached a node where an early clearing response signal is sent and blocking is performed again.

The interconnect may also simply send the barrier transaction along the various paths behind the previous transactions and ahead of the subsequent transactions and not allow any reordering of transactions across it, so that when the barrier is detected as reaching a certain point the interconnect can be sure that all the previous transactions have already passed through this point. Whether it simply transmits the barrier within the stream, or delays the transactions depends on the nature of the barrier and whether it is a blocking barrier or not, a blocking barrier being one that has blocked at least some of the subsequent transaction requests at a previous upstream point.

The progress of the barrier transactions is controlled by control circuitry 70. This is schematically shown as a single block in this figure, however in reality the control circuitry is distributed throughout the interconnect adjacent to the circuitry that it controls. Thus, at each split point for example there will be some control circuitry that ensures at least in some embodiments that when a barrier transaction is received it is duplicated and a duplicate barrier transaction is sent down each exit path from the split point. There may be other embodiments where the duplicated barrier is sent down all but one exit paths, and this will be described later. The control circuitry will be aware that the barrier transaction has been duplicated and thus, may require response signals from each duplicated barrier transaction before it can clear the paths for transmission of the transactions that are subsequent to the original barrier transaction and must remain subsequent to it.

In its simplest form a barrier transaction is issued by a master, for example master 20 and the master 20 then blocks all subsequent transactions until it has a response signal from the interconnect indicating that it can transmit the subsequent transactions. Alternatively the barrier may be issued by the control circuitry immediately on entry to the interconnect. The transactions before the barrier transaction and the barrier transaction are transmitted to the interconnect and control circuitry 70 controls the routing of these transactions. Thus, at split point 42 the barrier transaction is duplicated and it travels to merge points 44 and 45. At this point the transactions are entering bisection paths 50 and 52 and as transactions cannot change their position with respect to a barrier on these paths when the barrier transaction arrives at the start of one of these paths one knows that all the transactions previous to it are ahead of it and will remain ahead of it along that path. Thus, an early response signal can be sent by early response units 80 and in response to receiving both of these signals the control circuitry at split point 42 sends the early response signal to master 20 which can then unblock the transactions subsequent to the barrier transaction that are controlled by it and transmit them into the interconnect.

By providing an early response unit 80, master 20 is blocked for a much shorter time than had it awaited the response from the slaves indicating that the barrier transactions had reached the slaves and in this way the latency introduced by the barrier transactions is reduced.

The barrier transaction that passes along path 50 exits the interconnect and arrives at slave 30 without travelling along any path other than bisection path 50 and thus, there is no need to block again in response to this barrier transaction as once the barrier has passed early response unit 80 the transactions in front of it must remain there. However, the barrier transaction that is sent along path 52 reaches a further cross-coupled section 48 and in response to receipt of the barrier transaction at the split point 49 control circuitry 70 associated with this split point duplicates the barrier transaction, sends it down both exit paths and blocks the entry path behind it to transaction requests that occur subsequent to the barrier and that are controlled by it. Thus, these subsequent transactions are stalled in some embodiments by being held in a buffer within the blocking circuitry 90 until a response signal is received to all duplicated barrier transactions. Thus, the duplicated barrier transactions pass through the cross-coupled circuitry 40 and exit the cross-coupled circuitry to join further bisection links 52 and 50. As noted before, a bisection path retains transactions in order relative to the barrier and thus, an early response can be sent from the start of the bisection path by early response units 80. Blocking circuitry 90 waits to receive a response to the barrier transaction from split point 49. Spilt point 49 duplicates the barrier transaction and sends two barrier transactions further one down each path. Split point 49 does not send a response back to blocking circuitry 90 until it has received a response from each of the two barrier transactions that it has transmitted. In response to this response, blocking circuitry 90 allows any subsequent transactions held in its buffer to be transmitted. As the clearing circuitry is on the last bisection path before exit to the interconnect there is no need for further blocking for some barrier types.

There is as noted previously a re-order buffer 60 on bisection path 52 and this buffer is configured to be responsive to the barriers and does not allow transactions controlled by the barriers to be re-ordered with respect to the barriers.

In the previous description it is assumed that a barrier is there to maintain all the transactions that are subsequent to it behind it. However, in some embodiments, as will be seen in more detail later, the barrier may only need to stop a subset of the subsequent transactions from overtaking it, perhaps those from a particular master or those with a particular function, such as write transactions. In such a case, the control circuitry 70 and blocking circuitry 90 will only delay this subset of transactions and will allow the others to proceed. Furthermore, at a split point if the transactions that are controlled by the barrier will never go down one of the paths, a duplicated barrier does not need to be sent down that path.

Figure 2:
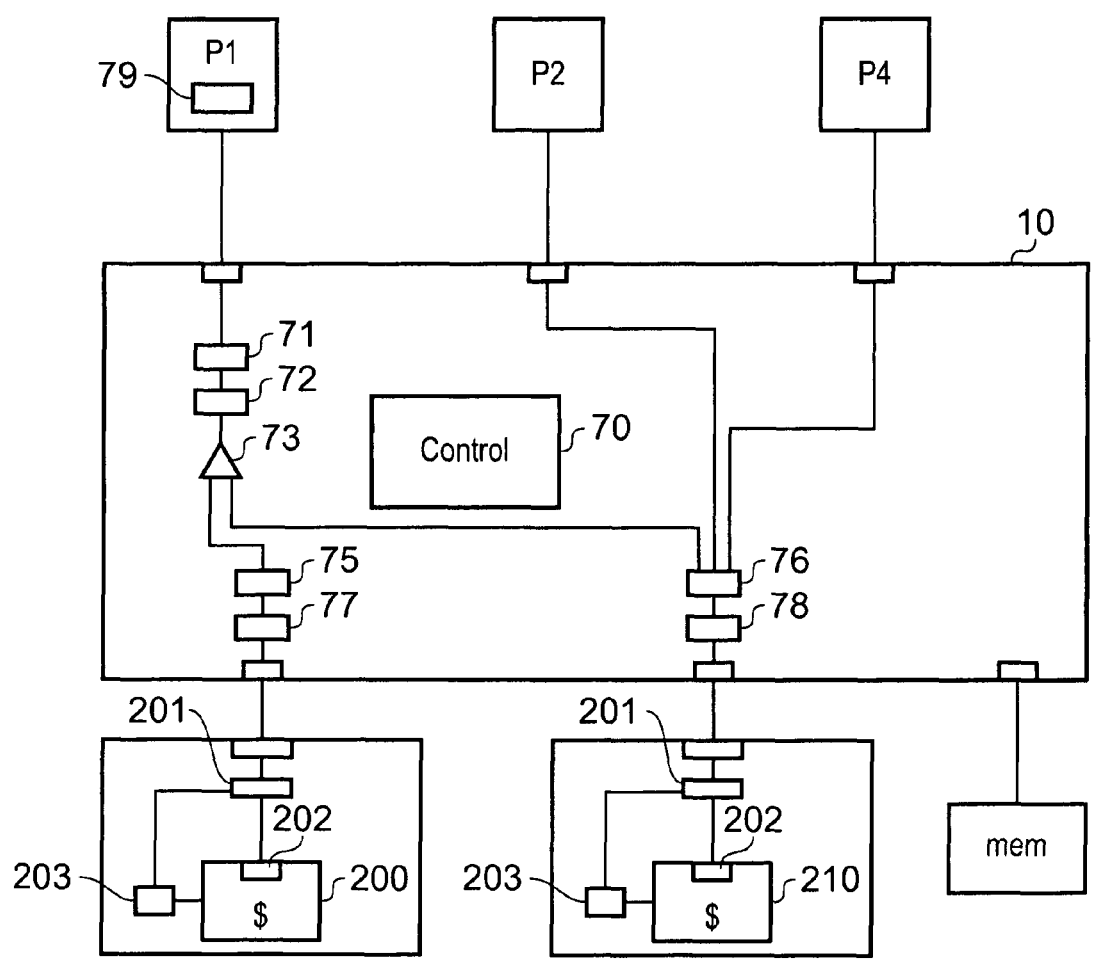
FIG. 2 shows a system comprising an interconnect according to an embodiment of the present invention.

FIG. 2 shows an interconnect having a plurality of processors P1, P2, P3 accessing in this embodiment two caches 200, 210 via an interconnect 10. As noted previously in a complex system with many devices accessing various data stores, including different caches and different memories, maintaining data coherency can be a complex problem. This involves the need to perform cache maintenance operations at certain times to ensure that data storage in the various stores remains coherent.

If a program is being written for a system where the detailed architecture is not known, dealing with such cache maintenance operations can be difficult. A cache maintenance operation can be issued, but it may be difficult to know when it has completed. This is particularly so in systems which have different hierarchical levels of caches and caches located within the interconnect as in such systems it is difficult to know if a particular cache is the last cache along a particular path or not. This problem is addressed in embodiments of the present invention by the use of barrier transactions.

Thus, when a cache maintenance operation is issued, a barrier is issued to follow it. The passage of the barrier can be tracked and thus, as the cache maintenance operation is in front of it, it can be tracked too. The properties of the barrier can be selected according to the cache maintenance request, thus a barrier that simply prevents any subsequent transaction from overtaking the cache maintenance request may be selected or one that blocks subsequent transactions at a certain point may be used. A barrier generator 79 is shown within master P1 and this generates and issues a barrier transaction request in response to a request from master P1. Master instructs the barrier generator to generate a barrier when it has generated and issued a cache coherency maintenance request, the properties of the barrier may be selected in accordance with the maintenance operations to be performed.

The barrier generated may be a blocking barrier or a non-blocking barrier, if it is a blocking barrier then master P1 does not issue any further transaction requests to which this barrier applies until it has received a response to this barrier In the embodiment illustrated in FIG. 2 there is an early response unit 71 followed by a blocking circuit 72 followed by point of divergence 73. Control circuitry 70 within the interconnect detects a cache maintenance request and the following barrier transaction received from processor P1 and if it is a blocking barrier, it will issue a response to the barrier at early response unit 71 and this early response will be received at master P1 which can then transmit any blocked transaction requests further. Blocking circuitry 72 then blocks further transaction requests that are subject to the barrier transaction request. If it is not a blocking barrier then the barrier transaction request is simply transmitted through the early response unit and the blocking circuit.

The cache maintenance request followed by the barrier transaction request then arrive at the point of divergence 73 and control circuitry 70 determines that cache maintenance needs to be performed on both cache 200 and cache 210 and therefore duplicates both the cache maintenance request and the barrier transaction which is following it. These requests are then transmitted further towards cache 200 and 210. Interconnect circuitry 10 has early response units 75 and 76 before the respective interconnect outputs to caches 200 and 210 and along with blocking units 77 and 78, and if the barrier is a blocking barrier upon the barrier transaction reaching the early response units 75 and 76 responses are sent and in response to receipt of both responses blocking circuitry 72 allows subsequent transactions to be sent further. However, these subsequent transactions will then be blocked by blocking circuitry 77 and 78 when they arrive at these points.

The caches 200 and 210 that lie within respective recipient devices then receive the cache maintenance requests followed by the barrier transaction requests and if the barrier was a blocking barrier response circuitry 201 associated with each cache sends a response to the barrier transaction request when control circuitry 203 has determined that the cache maintenance operations have proceeded to a point at which further transaction requests can be safely dealt with. Thus, if for example, the cache is being flushed as soon as some of the lines have been marked as invalid, and the cache has space for further transactions to be dealt with a response can be sent. Responding to the barrier at this point can be advantageous as if for example, the cache was full of dirty lines, then writing all of this data back to memory would take a long time. Once the process has started there are lines in the cache available for storing data and thus, further transactions can be performed. If the barrier transaction request is a non-blocking barrier then it is held at the input interface 202 of the respective caches until the caches have processed the cache maintenance request sufficiently to safely receive further transactions at which point the barrier transaction request is either transmitted further behind other data store maintenance operations triggered by the cache maintenance request or it is eliminated.

If the barriers were blocking barriers then when blocking circuitry 77 and 78 receive responses from response generator 201 they stop blocking subsequent transactions and these can proceed to the respective caches.

As noted above the barrier generator 79 is responsive to the type of cache maintenance operation to determine whether it generates a blocking or a non-blocking barrier. Thus, if for example the cache maintenance operation requested was simply an invalidate line operation, a non-blocking barrier could be issued that simply sat in the transaction stream behind this operation and did not allow transactions to pass it in either direction. As noted previously barrier transactions requests can maintain ordering of all transactions with respect to themselves or a subset of transactions. In the above case, the invalidate line is to a particular address and thus, the barrier may advantageously comprise this address in which case control circuitry 70 will only maintain the order of transactions with that address with respect to the barrier but will allow other transaction requests to be reordered with respect to the barrier as required.

Figure 3:
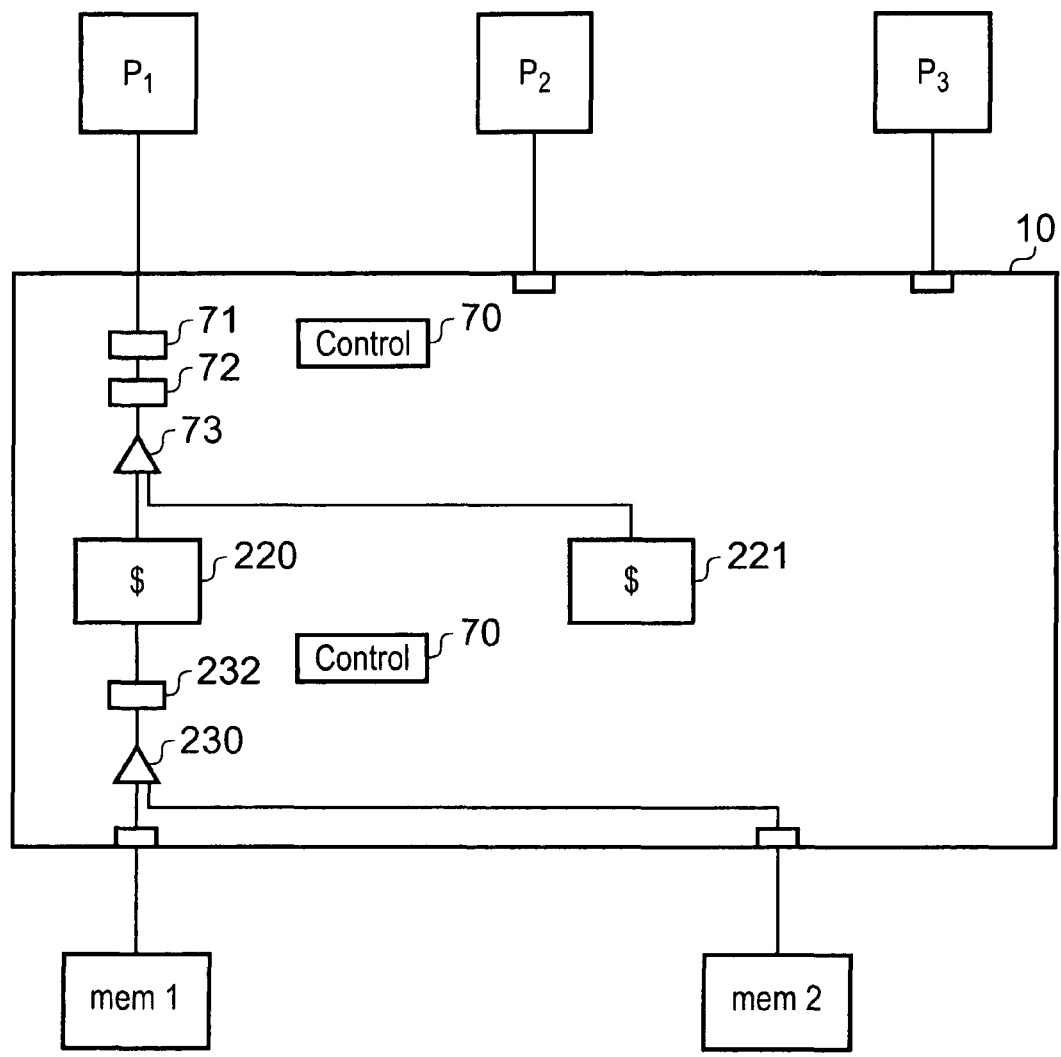
FIG. 3 shows a system comprising an interconnect according to another embodiment of the present invention.

FIG. 3 shows a further embodiment in this case, interconnect 10 comprises caches 220 and 221 and interconnects three processors P1, P2 and P3 with two memories MEM1 and MEM2. A cache maintenance transaction request received at interconnect 10 from P1 is followed by a blocking barrier transaction that has been generated by master P1 and indicates that subsequent transactions are blocked at P1 until receipt of a response signal. Early response signal generator 71 within the interconnect sends a response to master P1 allowing the subsequent transactions to proceed further. These subsequent transactions then encounter blocking circuitry 72 which acts to block these subsequent transactions until a response signal is received.

There is then a point of divergence 73 within the interconnect and the barrier and cache maintenance transactions may be duplicated and sent further to caches 220 and 221. If this is the case the control circuitry 70 associated with the point of divergence will hold any response signal received from one cache and will only transmit a response signal to blocking circuitry 72 when it has received a response signal from both of the caches.

Were the cache maintenance transaction only to be performed on cache 220, then the barrier and cache maintenance transactions are not duplicated they are simply sent to cache 220 and no blocking is required. The barrier transaction simply sitting at the input to the cache 220 stopping other transactions from entering the cache until the cache is ready to receive the barrier transaction and transmit it further.

If the cache 220 generates transactions in response to the cache maintenance request that are sent to the memories then the barrier transaction request is also sent behind these. There is a point of divergence 230 on the path to the memories and control circuitry 70 associated with point of divergence 230 transmits the generated transactions and the following barrier transaction request to the appropriate memories. Thus, they may be transmitted to MEM1 and MEM2 or just to MEM1 depending on what maintenance operations were required. A barrier transaction is transmitted after the transactions and if a transaction is sent on both paths then the barrier transaction is duplicated and blocking circuitry 232 blocks the paths to subsequent transactions. If however, there is only one memory that needs to be accessed for the cache maintenance operations then a single barrier transaction is sent following that cache maintenance operation and no blocking needs to be performed.

If the maintenance operations are to selected address ranges then the barrier may be an addressed barrier specifying these address ranges, in such a case transactions to other addresses can overtake this barrier and if it is blocking it will only block transactions to the specified addresses. When the barrier reaches the memory it sits blocking the entrance to the memory until the operations within the memory due to the cache maintenance request have completed. At which point all subsequent transactions can enter the memory.

If the blocking barrier were duplicated and sent to both memories then when it enters each of the memories a response signal is sent and once both response signals have been received the blockage at blocking circuitry 232 is cleared and any blocked transaction requests can be sent further.

In FIG. 3 only connections between P1 and cache 220 and the memories are shown in detail, other connections exist but are not illustrated to make the figure clearer.

Figure 4:
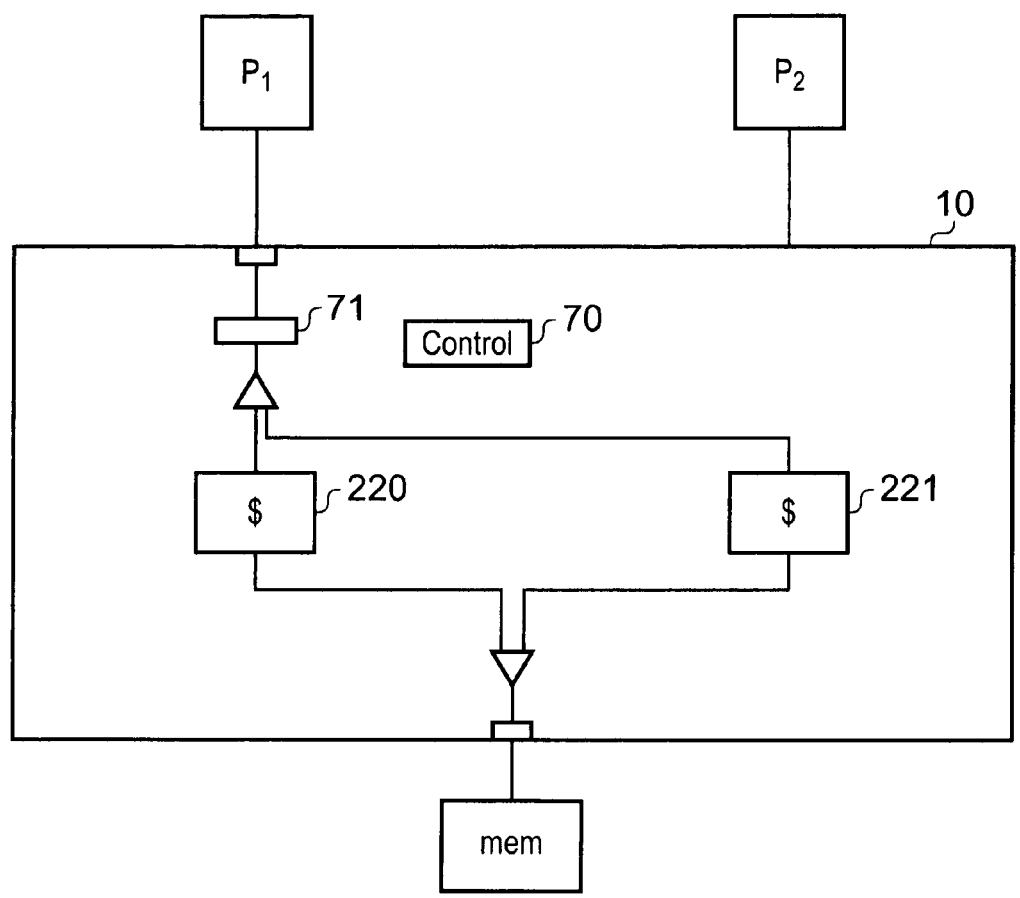
FIG. 4 shows an interconnect having caches according to an embodiment of the present invention.

FIG. 4 shows an alternative embodiment of the present invention where processor P1 can store data in cache 220 but not in cache 221. In response to receipt of a cache maintenance request followed by a barrier transaction request, control circuitry 70 recognises that processor P1 can only access cache 220 and cannot access cache 221 and thus, transmits the cache maintenance operation and the following barrier transaction to cache 220 and in the case of a blocking barrier early response unit 71 sends a response to processor P1. The barrier transaction sits at the entry to cache 220 and blocks further transactions from entering the cache until the cache maintenance operations within the cache have completed. At this point the barrier transaction is transmitted further behind any maintenance operations triggered by the cache maintenance operations and subsequent transactions can access the cache 220. In this way, access to the cache is not blocked until all cache maintenance operations are complete, it is only blocked until the operations within the cache itself are complete.

In the above-described embodiment of FIG. 4, the cache maintenance operation was a general cache maintenance operation to the cache. In some operations it may be to a particular address or range of addresses within the cache. In such a case, the barrier transaction will contain this information and the blocking circuitry will act only to block transactions to those addresses other transactions being transmitted. In this way, the latency of the system is considerable reduced.

Figure 5:
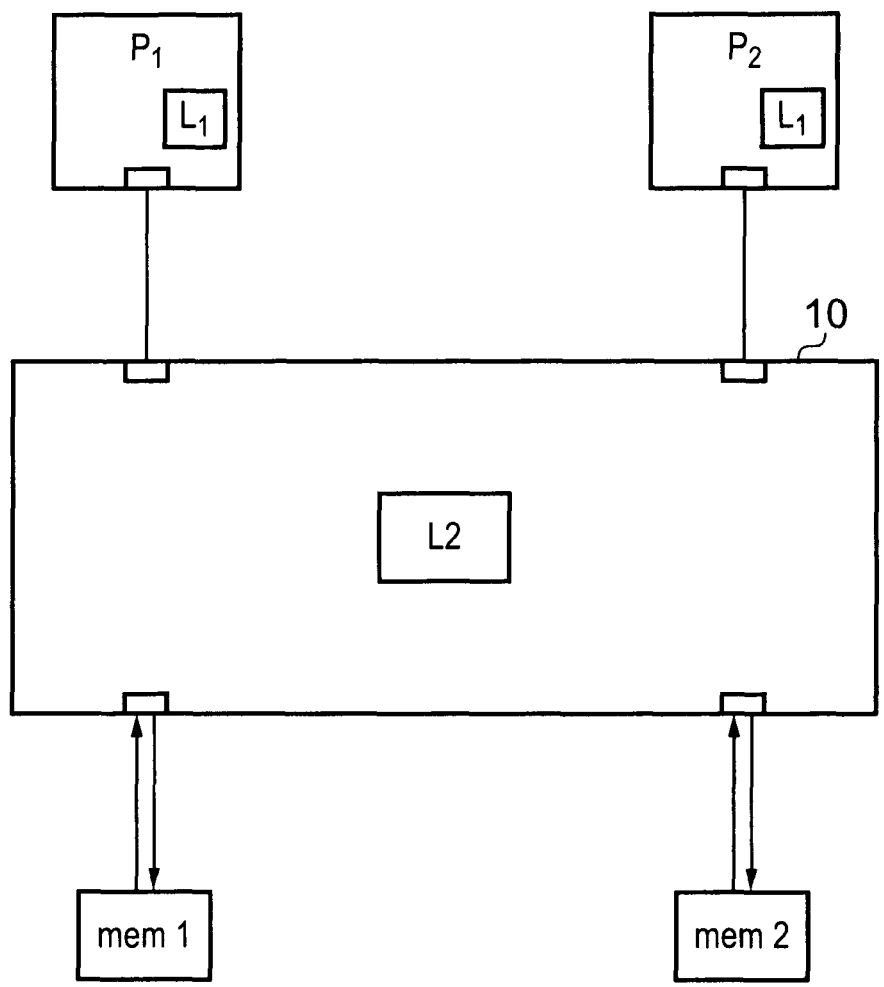
FIG. 5 shows a system having caches of different hierarchical levels.

FIG. 5 shows a system with a hierarchy of caches. In this embodiment the barrier generators within masters P1 and P2 may generate barriers with indicators indicating a cache hierarchy, for example they may indicate hierarchy level 2. In such a case this indicator indicates that a response should only be sent from the L2 cache. This enables the system to know when the cache maintenance operations are reached the level 2 shared cache.

In effect a barrier allows you to know where the transactions in front of it have reached as the barrier is not allowed to overtake any transactions (that it applies to and) that are in front of it. Thus, it can be used to determine when certain cache maintenance requests have reached particular caches or caches of a certain hierarchical level. The response circuitry on the cache can also be used to determine a suitable point in the cache maintenance operations to respond to the barrier, thus, rather than simply signalling the cache maintenance operations are complete a signal can be generated when it is safe to send subsequent transactions to the cache and in this way latency can be reduced.

Figure 6:
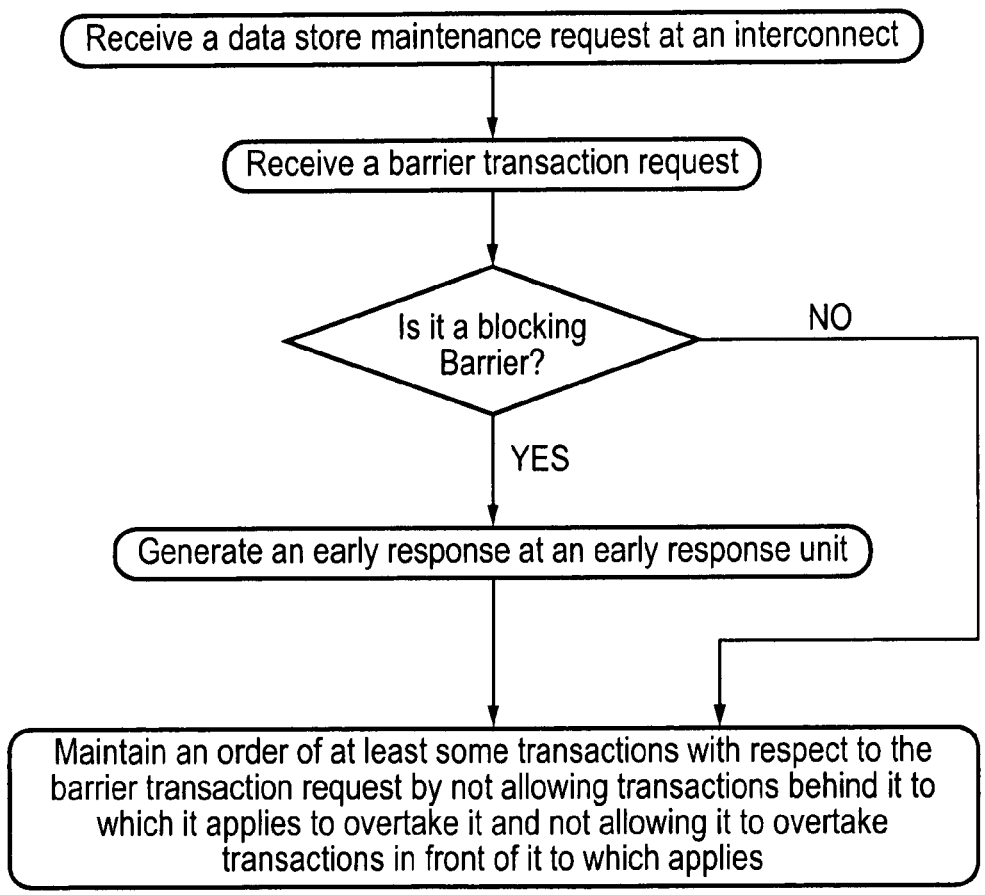
FIG. 6 shows a flow diagram illustrating a method according to an embodiment of the present invention.

FIG. 6 shows a flow diagram illustrating steps in a method for ensuring ordering of data store maintenance operations using barrier transaction requests according to an embodiment of the present invention. A data store maintenance request is received at an interconnect followed by a barrier. The request is transmitted along at least one path and is followed by the barrier. If the barrier is a blocking barrier transaction requests subject to the barrier and behind it in the transaction request stream are blocked somewhere upstream, and thus, if an early response unit is met a response is sent which releases the blocked transactions. Depending on the location of the early response unit a blocking unit may block again, in which case this blockage will be unblocked by a subsequent response unit. The barrier maintains the ordering of transactions to which it applies by not allowing these transactions to pass it in either direction.

Figure 7A:
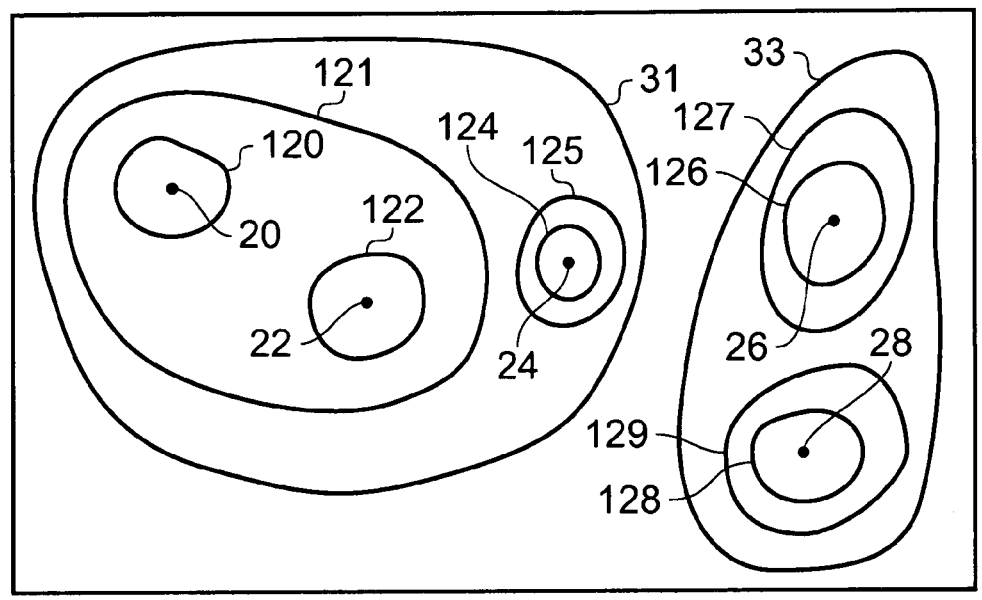
Figure 7B:
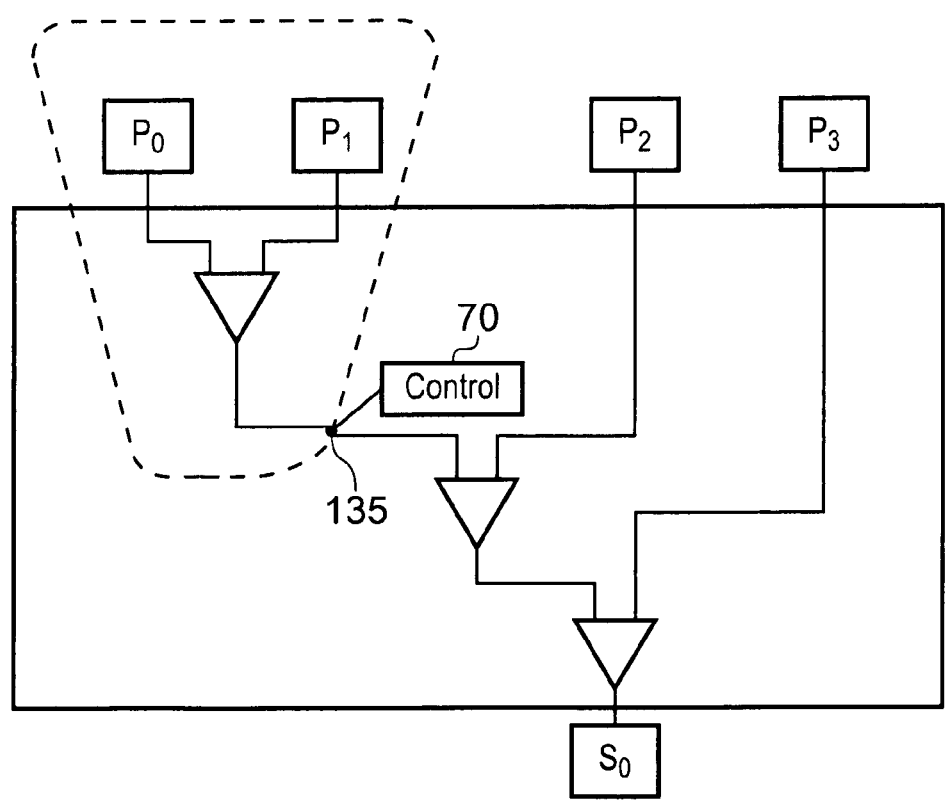
Figure 8:
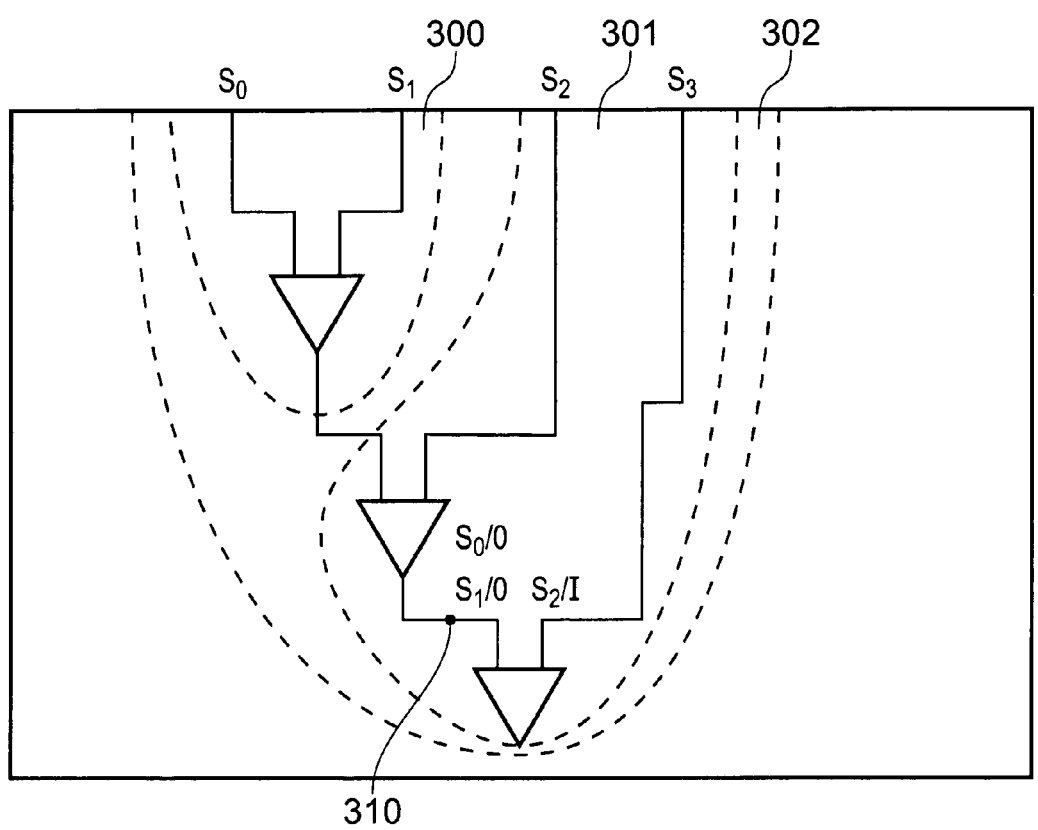

FIGS. 7 and 8 schematically show a way of dividing an interconnect into different domains that have particular properties and allow barriers to be treated differently and in particular to be responded to and no longer block depending on which domain they are in. These properties enable the latency associated with these barriers to be reduced.

There are a number of different ways of grouping masters and portions of the interconnect into different domains and controlling the barriers and transactions within the domains to ensure that the correct ordering of transactions is maintained while not unduly increasing latency. In this regard, it has been recognised that if certain rules are imposed on the topology of the interconnect relating to the domains, then the barriers will have certain properties that can be exploited to reduce the latency of the barriers. Arranging the domains in particular ways may produce constraints in the permitted topologies of the systems but may also decrease the latency produced by barriers, thus there are advantages and disadvantages to the different possible implementations of domains that are described below. Thus, for example if a cache maintenance transaction has a domain indicator associated with it, it can be followed by a barrier transaction with a similar domain indicator, as set out below domain indicators on barriers can generate early responses on domain boundaries and thereby reduce the latency associated with the barrier by allowing previous blockings to be cleared. Furthermore, if this property is used, receipt of a response signal will provide an indication that the barrier transaction request has reached this location in the interconnect and that therefore the cache maintenance request has also reached this location. In this way the location of the cache maintenance request can be determined independently from its operation.

It should be noted that although the barrier transaction may have the same domain indicator as the cache maintenance transaction it may have a different one, or it may have a domain indicator and the cache maintenance transaction not have such an indicator. For example, in the case of a cache flush, then this operation needs to proceed to memory where any write backs are being performed, however, for subsequent transactions to perform correctly once the transactions triggered by the flush have reached the outer domain it may be safe to allow other transactions to proceed. IN such a case marking the barrier transaction request with a suitable domain indicator allows a response to be sent when it reaches the outer domain at which point the initiator device can transmit transactions further.

In all of the arrangements of domains, if a barrier transaction is marked as relating to a particular domain, when it is outside of that domain and it is a blocking barrier it can always be unblocked except in a reconvergent region. Inside its domain certain types of barriers can be unblocked except in a cross coupled region. If the type of barrier that is always blocking in its domain is used behind a cache maintenance request then a response to this barrier will indicate that both the barrier and therefore the cache maintenance request have exited the domain indicted by the barrier.

In a first "null" implementation no account is taken of these domains. All barriers are treated as applying to all transactions in all parts of the system. This clearly is low in performance in that latency from the barriers will be high. However, it does permit unrestricted, arbitrary domain membership (even if that membership has no effect) and topology and so can always be built. This is logically equivalent to all domains including all masters in all their domains.

In an alternative "nearly null" implementation there are non-shareable domains that relate to each master and barriers related to these domains are treated differently outside of this domain. As a non-shareable barrier is outside its shareability domain everywhere beyond the input from the master, it can be treated as such in the whole interconnect and therefore be non-blocking in all non reconvergent parts of the interconnect. Other shareability domain barrier transactions are treated as in the null implementation. This is logically equivalent to making the non-shareable domain boundary the issuer or master input, and all other domains contain all other masters.

An alternative "simple" implementation has some restricted topology and improved performance. This approach yields two different solutions depending on the level of restriction that may be accepted.

Three restrictions on shareability domain membership are common to both of these approaches:
 1. An observer's non-shareable domain is itself alone.
 2. An observer's system shareability domain comprises at least all other observers that it can communicate with directly or indirectly.
 3. All members of an observer's inner shareable domain are also members of its outer shareable domain.

The first two of these are the restrictions imposed by [3]. In addition, each of the two solutions has specific topological restrictions and possibly additional shareability domain membership restrictions.

The first of these two implementations requires a restriction that each location is in a single domain, and thus, depends on each location in the interconnect being in only one kind of domain, inner, outer or system. To enable this, an additional shareability domain membership restriction must be enforced:

All members of any shareability domain of any observer must have all other members of that shareability domain as members of their same level of shareability domain. I.e. if observer B is a member of observer A's inner shareable domain, then reciprocally A must be a member of B's inner shareability domain.

The topological restrictions that must be met are:
 1. The domain boundary must include all members of the domain
 2. Nothing outwith a domain may merge into the domain—i.e. the domain boundary must not include anything that is downstream of anything not inside the domain boundary
 3. All domain boundaries must lie on domain bisection links A simple way to think of the domain boundaries in this case is as topographical contour lines representing altitude (where vertical faces are permitted, but overhangs are not). Each master is at the same height, and each shareability domain contour is at the same height as all others of the same type. Vertical cliffs are permitted to allow shareability domains of the different types to be identical, but overhangs, which would allow the crossing of shareability domains are not.

These topological restrictions require that nothing may merge into the domain—neither members of the domain (which would violate restriction 1) nor non-members (which would violate restriction 2) If a split downstream of a member exits the domain and then re-merges into it without also merging with something outwith the domain then the part between exit and re-entry is effectively still in the domain.

The topological and domain membership restrictions combined ensure that, within its shareability domain, a barrier cannot encounter a transaction from an observer outwith that domain and that when it exits the domain it will have merged with all transaction streams from all members of the domain that it will ever merge with. They also ensure that any location that is outside of any inner shareable domain is outside of all inner shareable domains, and if outside of any outer shareable domain is outside of all outer shareable domains.

As a result of this, the requirement for a barrier to be blocking at a split point may be determined by simply comparing the shareability domain of the barrier with the domain type that the split point lies within as the requirement that no member of the shareability domain can merge downstream of the location is met implicitly by the barrier being outwith that domain in such a constrained system.

This mechanism can be implemented by either explicit indication of the barrier being outwith its shareability domain, which would require an explicit detection component at domain exit points, or determination of that status at each relevant split point.

The second of these two implementations allows locations in multiple domains. This implementation depends on the indicated shareability domain of a barrier transaction being modified as it passes through the boundaries of shareability domains so that once it exits its shareability domain it becomes non-blocking by making the transition. As it passes out of an inner or outer shareable domain its indicated domain moves towards non-shareable, and when marked as non-shareable it is known to be outside its domain and so can be non-blocking.

In this case the additional restriction on shareability domain membership is looser:

For any two shareability domains, A and B, either all members of A must also be members of B or all members of B must also be members of A, or both (in which case A and B are identical). In other words, the domain boundaries may not cross.

The same topology restrictions are required:
1. The domain boundary must include all members of the domain To permit maximum flexibility of topology, it must just be possible to decompose the topology components (split and merge) so that the domain boundary may be drawn such that
2. Nothing outwith a domain may merge into the domain— i.e. the domain boundary must not include anything that is downstream of anything not inside the domain boundary
3. The domain boundary lies across domain bisection links Finally, an additional topological restriction is imposed to compensate for problems introduced by the looser restriction on domain membership:
4. No boundary location can be for a different number of domains for different masters excluding masters for which that location is already outwith their outer shareability domain.

Restriction 4 ensures that where a barrier has to be modified as it crosses a domain boundary, it crosses a boundary for all domains it is in. This ensures that the modification operation is not dependent on the originator of the barrier.

If a barrier is modified and acquires non-blocking status, it may of course be unblocked if it is on a bisection link, but in some circumstances it may be unblocked despite being on a cross-coupled link. If the links crossing the domain boundary are domain bisection links that is they are bisection as far as that domain is concerned, i.e. they do not merge with paths from their own domain, only with paths coming from other domains, then the modification of the barrier transaction happens there and the unblocking may also occur from that point.

Restriction 2 may be waived if, in addition to changing the indicated domain towards non-shareable on domain exit, the indicated domain is changed away from non-shareable on domain entry. This requires a domain indicator that does not saturate, or a restriction on the number of domains that may be entered so that saturation does not occur. In addition, this will result in barriers that have entered a domain being blocking of transactions from non-members of that domain due to their increased indicated scope.

FIG. 7a shows very schematically the above implementation of domains within an interconnect. In this figure the masters are shown within the interconnect although in reality they are of course external to it. Each master 20, 22, 24, 26, 28 has a stream or non-shareable domain 120, 122, 124, 126, 127 immediately surrounding it which is relevant only to transactions generated by itself. There are then some next hierarchical level domains which may encompass a plurality of masters or simply the same master again thus, masters 20 and 22 have their non-shareable domain and then have an inner domain 121 around them, while master 24 has an inner domain 125, master 26 has a non-shareable domain 126 and an inner domain 127 and master 28 has a non-shareable domain 128 and an inner domain 129. There are then outer domains which surround them which in this case are domains 31 and 33. There is then the system domain which is the whole interconnect. As can be seen domains lie completely within each other and do not intercept in any way. There is also a constraint that all exit paths from domains are bisection paths. By constraining the domains in this way one can be sure that transactions leaving these domains will do so in a certain way, and as they leave on bisection paths provided that within the domain the barriers function correctly they will leave in a correct order. This allows control of the barrier transactions with respect to these domains in a particular way.

FIG. 7b shows schematically an exit node 135 to a domain that includes masters p0 and p1. This exit node 135 is controlled by control circuitry 70 and at this node it is known that any barrier transaction and the transactions it controls are in the correct order. Now as noted previously barrier transactions do not necessarily control all transactions but may control transactions generated by particular masters or transactions of a particular function.

In the case of shareability domains, barrier transactions are marked as controlling transactions from particular domains. Thus, a transaction may be marked as a system barrier transaction in that it controls all transactions, it may be marked as controlling transactions from a stream or non-shareable domain, from an inner domain or from an outer domain. In any case, when a barrier transaction exits a domain it can in this implementation have this hierarchical level reduced so that if it were an outer domain barrier when it exited the inner domain it will be reduced to a barrier transaction controlling transactions from an inner domain and when it exits the outer domain it will have the hierarchical level of its control reduced to a non-shareable domain where no transactions need to be delayed by it. This is possible as at this point all the transactions are ordered with respect to this barrier and provided there are no re-convergent paths then the interconnect is sure that the ordering will be correct. It should be noted that system barriers do not change on exiting domains as they always apply to everything everywhere.

It should be noted that if there are reconvergent paths within a domain then any non-blocking barrier must become blocking across the reconvergent region. If a further interconnect that introduces re-convergent paths is connected to an interconnect having domains then the domain system of controlling barriers no longer works. If an interconnect is added that affects the domains and their hierarchy then the system is controlled such that the shareability domain indicator in the barrier transaction is not reduced when it exits the domain.

It should be noted with respect to reconvergent regions, that some transactions to particular addresses may be restrained to pass along a particular route through the reconvergent region and in such a case the reconvergent region is not reconvergent for that address, An interconnect may be constrained so that transactions pass along a particular route to a particular address for all addresses, in such a case any reconvergent region may be treated as a cross coupled region, which may be advantageous owing to the considerable constraints on the system that a reconvergent region imposes.

Owing to the way the interconnect is configured, any barrier transaction within a domain that is not marked as a non-shareable barrier will in effect control transactions of any domain that it encounters as it will not encounter transactions from another domain. A barrier transaction that is marked as a non-shareable barrier will not delay any of the transactions subsequent to it, however, no transaction will be allowed to be reordered with respect to this transaction. In this way, by arranging the interconnect domains in this way and by reducing the hierarchical level of the indicator on exit of the domains a simple way of determining whether the barrier transaction must delay all transactions it meets or none, is used without the need for the control components to know exactly which domain they are in within the interconnect.

A further possible implementation for the domains is the "complex" implementation. This can be used if the topological restrictions or domain membership restrictions above are considered too restrictive. Assuming the requirements on non-shareable and system domain membership are to be retained, the information required is an explicitly enumerated list of what combinations of barrier issuer and shareability domain may be considered non-blocking at that location. Thus, rather than being able to determine the blocking nature of the barrier from the barrier itself as in the implementations described with respect to FIGS. 5a and 5b, the blocking nature of the barrier is determined from the location, the domain information being stored at the location.

This can be done with two lists at each relevant location, one for inner shareable domains and one for outer shareable domains. Each list indicates the set or barrier sources for which the location is outside of that domain. Alternatively, a list could be stored of sources with a two bit value indicating which shareability domains of that source the location is outside.

However the information is represented, it is clearly significantly more complex and more difficult to enable design reuse due to differing requirements to represent the domain information when a system is reused.

FIG. 8 shows an example of such an interconnect. This interconnect receives transaction requests from four masters, S0, S1, S2 or S3. S0 and S1 are in an inner domain 200, while S2 or S3 are in an inner domain 301 and they are all in an outer domain 302. There are other masters not shown that have other domains.

At location 310 one is in the inner domain for transactions coming from S2 and in the outer domain for transactions coming from S0 or S1. Thus, this location can be marked as such, and when barriers are received it can be determined which domain they relate to and thus, whether or not the barrier is outside of its domain. Thus, a barrier that applies to the S0, S1 inner domain is outside of its domain and it can be marked as such or an early response sent depending on the embodiment. This is clearly quite complicated.

An alternative to this is the conservative complex implementation. This is used if the topological and domain membership freedom of the complex implementation is required but the implementation and re-use issues must be avoided. In this case it is possible to make every component which must exhibit domain-location-specific behaviour consider itself to be in a particular level of domain and achieve correct behaviour. If the component considers itself to be in the smallest domain of any that it actually lies within then it will be conservative (yet correct) in its behaviour for barriers that are actually outside their domain and correct for those that are within their domain. In this regard it should be noted that the properties of barriers, domains or transactions can be changed where that may enable them to be treated more efficiently provided they are changed to be more restrictive. Thus, a barrier that is marked as inner can be treated as an outer barrier and a transaction that is marked as applying to an outer domain can be marked as applying to the inner domain.

With this approach, the components that need to be domain aware can simply be programmed or configured to have a single domain (with a safe default of inner domain membership, this can be used on power up).

Thus, in this implementation a location within the domains is marked as having the properties of the domain with the most restrictive behaviour it is a member of, which is the domain of the lowest hierarchical level excluding the non-shareable domain. Barrier transactions at that location are then treated as being within such a domain. In such an arrangement domains are allowed to be a partial subset of other domains. In this arrangement rather than changing the marking on a barrier as it exits domains in order to adjust the blocking behaviour of the barrier without the need to know where in the interconnect one is, locations in the interconnect are marked as being in a particular domain, depending on the lowest hierarchical or smallest shareable domain they are located in.

In the example of FIG. 8 for example, the location 310 does not need to be marked with three different marks, it is simply marked with the smallest shareable domain that it is within, that is inner. Thus, in this case any barrier marked as being inner or outer is considered to be within this domain and a barrier from the S0, S1 inner domain will be considered to be within its domain, even though it is not. Thus, no early response can be sent and the latency of the interconnect will increase which is the downside of this approach. However the marking of the domain is simpler as is the determination of whether a barrier is within the domain or not.

Various further aspects and features of the present invention are defined in the appended claims. Various modifications can be made to the embodiments herein before described without departing from the scope of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Interconnect circuitry for a data processing apparatus, said interconnect circuitry being configured to provide data routes via which at least one initiator device may access at least one recipient device, said interconnect circuitry comprising:

at least one input configured to receive transaction requests from said at least one initiator device;

at least one output configured to output said transaction requests to said at least one recipient device;

a plurality of paths configured to transmit said transaction requests between said at least one input and said at least one output; wherein at least one of said transaction requests comprises a data store maintenance request requesting a data store maintenance operation to be performed on data stores within said data processing apparatus; and control circuitry configured to route said transaction requests along at least one of said plurality of paths from said at least one input to said at least one output; wherein said control circuitry is configured to respond to receipt of said data store maintenance request by transmitting said data store maintenance request along at least one of said plurality of paths followed by a barrier transaction request, said control circuitry configured to maintain an ordering of at least some of said transaction requests with respect to said barrier transaction request within a stream of said transaction requests passing along said at least one of said plurality of paths, such that said at least some transaction requests prior to said data store maintenance request in said stream of transaction requests are held in front of said data store maintenance request by said barrier transaction request and at least some of said transaction requests subsequent to said data store maintenance request in said stream of transaction requests are held behind said data store maintenance request by said barrier transaction request.

2. Interconnect circuitry according to claim 1, wherein said control circuitry is configured to respond to said barrier transaction request to maintain said ordering of said at least some transaction requests subsequent to said barrier transaction request by delaying transmission along said one of said plurality of paths of said at least some transaction requests until receipt of a response signal clearing said barrier transaction.

3. Interconnect circuitry according to claim 1, wherein said data store maintenance request comprises a cache maintenance request, said data processing apparatus comprising at least one memory and one or more caches for storing local copies of data items stored in said at least one memory, said interconnect circuitry configured to transmit said cache maintenance request and said barrier transaction request to at least one of said one or more caches.

4. Interconnect circuitry according to claim 3, wherein said control circuitry is configured to respond to said barrier transaction request to maintain said ordering of said at least some transaction requests subsequent to said barrier transaction request by delaying transmission along said one of said plurality of paths of said at least some transaction requests until receipt of a response signal clearing said barrier transaction and said interconnect circuitry is configured to receive said response signal from said at least one cache.

5. Interconnect circuitry according to claim 3, wherein said interconnect circuitry comprises at least one of said one or more caches, said at least one cache being configured to hold said barrier transaction request at an input to said cache and not to receive any further transaction requests, and in response to control circuitry associated with said cache determining that said cache maintenance request has been processed to a point at which it is safe to receive further transaction requests said at least one cache is configured to receive said further transaction requests.

6. Interconnect circuitry according to claim 5, wherein if said cache maintenance request triggers transaction requests to be transmitted to further data stores, said point comprises a point at which all transactions stemming from said cache maintenance operations have been transmitted further, said control circuitry configured to transmit said barrier transaction request further behind said transactions stemming from said cache maintenance operation.

7. Interconnect circuitry according to claim 5, wherein if said cache maintenance request does not trigger further transaction requests, said control circuitry is configured to eliminate said barrier transaction request in response to determining that said cache maintenance request has been processed to said point at which it is safe to receive further transaction requests.

8. Interconnect circuitry according to claim 3, wherein said cache maintenance request is directed to one or more addresses, said barrier transaction request comprising a corresponding one or more addresses, said control circuitry configured to route said barrier transaction request and said cache maintenance request along at least some of said plurality of paths.

9. Interconnect circuitry according to claim 8, wherein said at least some transaction requests subsequent to said cache maintenance request and held behind it by said barrier transaction request comprise transaction requests to said one or more addresses.

10. Interconnect circuitry according to claim 8, said at least some of said plurality of paths are paths to any of said one or more caches that could cache data for said one or more addresses.

11. Interconnect circuitry according to claim 3, said control circuitry being configured to route said barrier transaction request and said cache maintenance request along at least some of said plurality of paths, said at least some of said plurality of paths comprising paths to any cache to which said initiator initiating said cache maintenance request can cache data.

12. Interconnect circuitry according to claim 1, at least some of said plurality of paths are divergent paths diverging from a node, said control circuitry configured to duplicate and transmit said data store maintenance request and said following barrier transaction request along at least some of said divergent paths that said transaction requests are routed along.

13. Interconnect circuitry according to claim 12, said control circuitry configured to delay transmission of said at least some transaction requests subsequent to said barrier transaction request until after receipt of response signals responding to all of said duplicated barrier transaction requests.

14. Interconnect circuitry according to claim 1, said control circuitry comprising a response signal generator located at a point of serialisation within said interconnect, beyond which point transaction requests cannot be reordered, said response signal generator configured to generate said response signal to said barrier transaction request and to not transmit sad barrier transaction request further.

15. Interconnect circuitry according to according to claim 1, said control circuitry comprising a response signal generator and blocking circuitry, said response signal generator responsive to receipt of said barrier transaction request to issue said response signal along an entry path from which said barrier transaction request was received, and said blocking circuitry responsive to receipt of said barrier transaction request to block all exit paths that said barrier transaction request is transmitted along, to said at least some transaction requests subsequent to said barrier transaction request until receipt of said response signal.

16. Interconnect circuitry according to claim 15, wherein said response signal generator is located immediately upstream of said blocking circuitry.

17. Interconnect circuitry according to claim 15, wherein said plurality of paths comprise at least one bisection path that comprises only a single communication path between two nodes within said interconnect circuitry, said two nodes comprising an entry node and an exit node to said bisection path;
said response signal generator located at said entry node and responsive to receipt of said barrier transaction request to transmit said response signal along said entry path from which said barrier transaction request was received; and
said blocking circuitry located at said exit node and responsive to receipt of said barrier transaction request to block all exit paths that said barrier transaction request is transmitted along to said at least some transaction requests subsequent to said barrier transaction requests.

18. Interconnect circuitry according to claim 1, said interconnect circuitry comprising at least one domain, said at least one domain comprising at least one of said inputs for receiving transaction requests from said at least one initiator device, a domain boundary arranged such that any merging of transaction requests received from said at least one input occurs within said at least one domain; and
said barrier transaction request comprises an indicator indicating whether it applies to said at least one domain; and
said control circuitry is responsive to detecting said barrier transaction request comprising said indicator indicating said barrier transaction request applies to said at least one domain and said barrier transaction request is outside of said at least one domain to provide an indication indicating that said barrier transaction is outside of said domain.

19. Interconnect circuitry according to claim 18, wherein said indication comprises an indicator applied to said barrier transaction request, said indicator indicating that said barrier transaction request is now outside of said domain to which it applies.

20. Interconnect circuitry according to claim 18, wherein said control circuitry comprises a response signal generator, said response signal generator configured not to respond to a predetermined type of barrier transaction request if said predetermined barrier transaction request is within a domain that said indicator indicates said barrier applies to and to respond to said predetermined type of barrier transaction request if said barrier transaction request is outside of said domain.

21. Interconnect circuitry according to any claim 18, said interconnect circuitry comprising a plurality of domains, each of said plurality of domains comprising at least one of said at least one inputs for receiving transaction requests from said at least one initiator device, domain boundaries are arranged such that any merging of transaction requests received from said at least one inputs within one of said domains occurs within said one of said domains.

22. Interconnect circuitry according to claim 21, wherein at least one of said plurality of domains is a subset of a larger domain and there is a hierarchy of domains for each input, such that if an input is a member of a domain of a lower hierarchy said domain lower hierarchy input is also a member of a domain of a higher hierarchy, and a transaction exits said domain of said lower hierarchy at a same time as or before said domain lower hierarchy input exits said domain of said higher hierarchy.

23. Interconnect circuitry according to claim 22, wherein said domains comprise a non-shareable domain containing only one of said inputs and a system domain comprising all of said inputs, and at least one further type of shareable domain, for each input there is a domain hierarchy such that an input within a non-shareable domain is also within said at least one type of shareable domain for said input, an input within said at least one type of shareable domain is also within said system domain for said input.

24. Interconnect circuitry according to claim 1, wherein said data processing apparatus comprises a plurality of caches of a plurality of hierarchical levels, said barrier transaction request comprising an indicator indicating at least one of said plurality of hierarchical levels, a cache of said at least one of said plurality of hierarchical levels being configured to generate a response signal in response to receiving said barrier transaction request.

25. A data processing apparatus comprising a plurality of initiators including at least one initiator device for generating and issuing transactions requests including data store maintenance transaction requests to a recipient device via an interconnect, comprising:
a barrier transaction request generator configured to generate a barrier transaction request, said barrier transaction request indicating to said interconnect that an ordering of at least some transaction requests within a stream of transaction requests passing through said interconnect should be maintained by not allowing reordering of said at least some of said transaction requests that occur before said barrier transaction request in said stream of transaction requests with respect to at least some of said transaction requests that occur after said barrier transaction request; wherein
said at least one initiator device is configured to issue said data store maintenance transaction request followed by said barrier transaction request; and
at least one recipient device and interconnect circuitry according to claim 1 for providing a data route between said plurality of initiators and said recipient device.

26. A recipient device for receiving transaction requests from an initiator device via an interconnect, said recipient device comprising:
an input configured to receive said transaction requests from said interconnect;
a cache;
a response signal generator configured to generate a response signal in response to a predetermined type of barrier transaction request;
said recipient device configured to respond to receipt of a cache maintenance request at said input followed by said predetermined type of barrier transaction request to generate said response to said barrier transaction request, said recipient device configured to issue said response signal when said recipient device has determined that said cache has performed sufficient cache maintenance operations for said cache to receive and process further transaction requests without compromising data coherency.

27. A recipient device according to claim 26, said recipient device responsive to receipt of a further type of barrier transaction request following a cache maintenance request to hold said barrier transaction request at an input to said recipient device and not to receive further transaction requests until said recipient device has determined that said cache has performed sufficient cache maintenance operations for said cache to receive and process further transaction requests without compromising data coherency, whereupon said barrier transaction request is transmitted further and said input receives further transaction requests.

28. An initiator device for generating and issuing transactions requests including data store maintenance transaction requests to a recipient device via an interconnect, comprising:
a barrier transaction request generator configured to generate a barrier transaction request, said barrier transaction request indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; wherein
said initiator device is configured to issue said data store maintenance transaction request followed by said barrier transaction request.

29. An initiator device according to claim 28, wherein said barrier generator is configured to provide said generated barrier transaction requests with a blocking or a non-blocking indicator in dependence upon said data store maintenance transaction request.

30. An initiator device according to claim 29, said initiator device configured;
in response to said barrier transaction request generator generating said barrier transaction request with said blocking indicator, to not issue said at least some transaction requests that occur after said barrier transaction request to said interconnect until said initiator device has received a response to said blocking barrier transaction request; and
in response to said barrier transaction request generator generating said barrier transaction requests with said non-blocking indicator, to issue said at least some transaction requests that occur after said barrier transaction request to said interconnect.

31. An initiator device according to claim 28, wherein said barrier generator is configured to provide said generated barrier transaction requests with a domain indicator indicative of a domain within said interconnect to which said barrier transaction request applies.

32. A method for routing data from at least one initiator device to at least one recipient device via interconnect circuitry, said method comprising:
receiving transaction requests from said at least one initiator device at at least one input, at least one of said transaction requests comprising a data store maintenance request requesting a data store maintenance operation to be performed on data stores within said data processing apparatus; and
transmitting said transaction requests along at least one of a plurality of paths towards at least one output;
in response to receipt of said data store maintenance request:
transmitting said data store maintenance request along at least one of said plurality of paths followed by a barrier transaction request;
maintaining an ordering of at least some transaction requests with respect to said barrier transaction request within a stream of transaction requests passing along said at least one of said plurality of paths by using said barrier transaction request to hold at least some transaction requests prior to said data store maintenance request in said stream of transaction requests in front of said data store maintenance request and at least some transaction requests subsequent to said data store maintenance request in said stream of transaction requests behind said data store maintenance request.

33. A method of generating and issuing data store maintenance transaction requests to a recipient device via an interconnect, comprising:
generating one of said data store maintenance transaction requests and then generating a barrier transaction request, said barrier transaction request indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; and
issuing said data store maintenance transaction request followed by said barrier transaction request.

* * * * *